Patented Sept. 25, 1934

1,974,506

UNITED STATES PATENT OFFICE 1,974,506

3.5 DIACETOXY MERCURI-4-NITROGUAIACOL

Edgar A. Peterson, Denver, Colo.

No Drawing. Application July 14, 1930,
Serial No. 467,974

3 Claims. (Cl. 260—13)

This invention relates to a bacteriocide and a process of preparing the same.

The object of the present invention is to produce a new and novel product for use as an antiseptic, bacteriocide, etc., and to a simple and economical process of producing the product.

In broad terminology, this new product consists of a mercury derivative of 4-nitro-ortho-guaiacol.

The following is a specific example of one process of manufacturing this new and novel product:

110 grams of 4-nitro-ortho-guaiacol is dissolved in 4000 cc. of hot $H_2O$, to which has been added 100 cc. of 40% sodium hydroxide.

To this initial solution is added, in a slow stream, 220 grams of mercuric acetate, which has been previously dissolved in 1500 cc. of boiling $H_2O$, the boiling water containing 10 cc. of glacial acetic acid.

The entire mixture is then boiled in any suitable apparatus containing agitating means at a temperature of approximately 90° C. A yellow precipitate soon begins to be thrown down and this boiling continues for approximately two hours. During the boiling step the mixture should be constantly stirred.

This precipitate is a di-murcuri-acet-oxy-4-nitro-ortho-guaiacol. The precipitate is filtered from the mother liquid and dissolved in 40% sodium hydroxide, after which, for purposes of purification, the alkali solution is precipitated with acetic acid until complete precipitation has taken place. The precipitate is then removed in any suitable manner and washed with a large volume of hot $H_2O$. The precipitate is further washed with methyl alcohol and finally with ether.

This resultant substance is a di-mercuri-acet-oxy-4-nitro-ortho-guaiacol and in physical form is a yellow crystalline material substantially insoluble in water and the usual organic solvents (alcohol and ether). Its boiling point cannot be determined as at 270° C. the substance decomposes, this temperature being less than the theoretical boiling point. The substance is soluble in dilute alkaline hydroxides and may be used as a bacteriocidal agent or as an antiseptic in such a solution.

The structural formula of this new and novel compound is

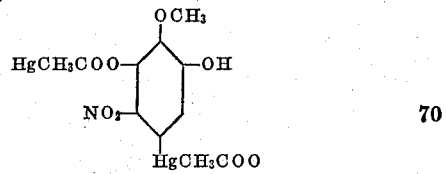

Other uses of the invention will be apparent to those skilled in the art, and it is obvious that the process above described may be varied within limits without departing from the invention as defined by the appended claims.

What is claimed is:

1. The product, di-acet-oxy-mercuri-4-nitro-ortho-guaiacol.

2. An organic compound having the structural formula

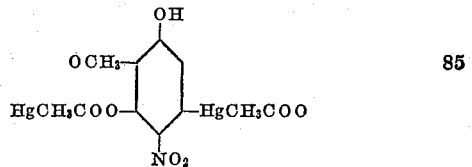

consisting of yellow crystals, insoluble in water, alcohol or ether, soluble in alkali solutions and having a melting point in excess of 270° C.

3. The product 3.5 diacetoxy mercuri-4-nitroguaiacol.

EDGAR A. PETERSON.